US012630023B2

(12) United States Patent
Kim et al.

(10) Patent No.: US 12,630,023 B2
(45) Date of Patent: May 19, 2026

(54) METHOD OF IMPLEMENTING ENGINE BRAKING USING A VIRTUAL GEAR SHIFT SYSTEM OF AN ELECTRIC VEHICLE

(71) Applicants: HYUNDAI MOTOR COMPANY, Seoul (KR); KIA CORPORATION, Seoul (KR)

(72) Inventors: Seong-Ho Kim, Anseong-si (KR); Seong-Ik Park, Seoul (KR); Sang-Won Oh, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 247 days.

(21) Appl. No.: 18/237,135

(22) Filed: Aug. 23, 2023

(65) Prior Publication Data

US 2024/0326602 A1 Oct. 3, 2024

(30) Foreign Application Priority Data

Mar. 30, 2023 (KR) ......................... 10-2023-0041632

(51) Int. Cl.
*B60L 7/18* (2006.01)
(52) U.S. Cl.
CPC ............. *B60L 7/18* (2013.01); *B60L 2260/30* (2013.01)
(58) Field of Classification Search
None
See application file for complete search history.

(56) References Cited

U.S. PATENT DOCUMENTS

| | | | | |
|---|---|---|---|---|
| 2013/0244829 A1* | 9/2013 | Nefcy | .................. | B60W 20/14 |
| | | | | 192/220 |
| 2014/0000971 A1* | 1/2014 | Wang | ................... | B60W 20/10 |
| | | | | 477/3 |
| 2022/0063494 A1* | 3/2022 | Duo' | ....................... | H04R 1/02 |
| 2022/0169123 A1 | 6/2022 | Baek | | |

FOREIGN PATENT DOCUMENTS

KR 20220077261 A 6/2022

* cited by examiner

*Primary Examiner* — Navid Z. Mehdizadeh
*Assistant Examiner* — Jason R Robinson
(74) *Attorney, Agent, or Firm* — Lempia Summerfield Katz LLC

(57) ABSTRACT

A method of implementing engine braking using a virtual gear shift (VGS) system of an electric vehicle (EV), which is connected with a VGS mode torque profile map, performs power-off down shift control by turning a VGS function on in response to an accelerator position scope (APS) off signal and a paddle shift signal. The method performs shift progress using a gear shift feeling torque compensating for a torque difference between a target gear shift stage and a current gear shift stage of the VGS. The method also controls vehicle deceleration to allow an amount of regenerative braking to increase using a target coasting torque as a gear is shifted to a lower gear shift stage to implement an engine braking feeling due to an increase in a deceleration feeling after the gear is shift.

8 Claims, 5 Drawing Sheets

GEAR SHIFT STAGE/
VIRTUAL RPM

FIG. 3

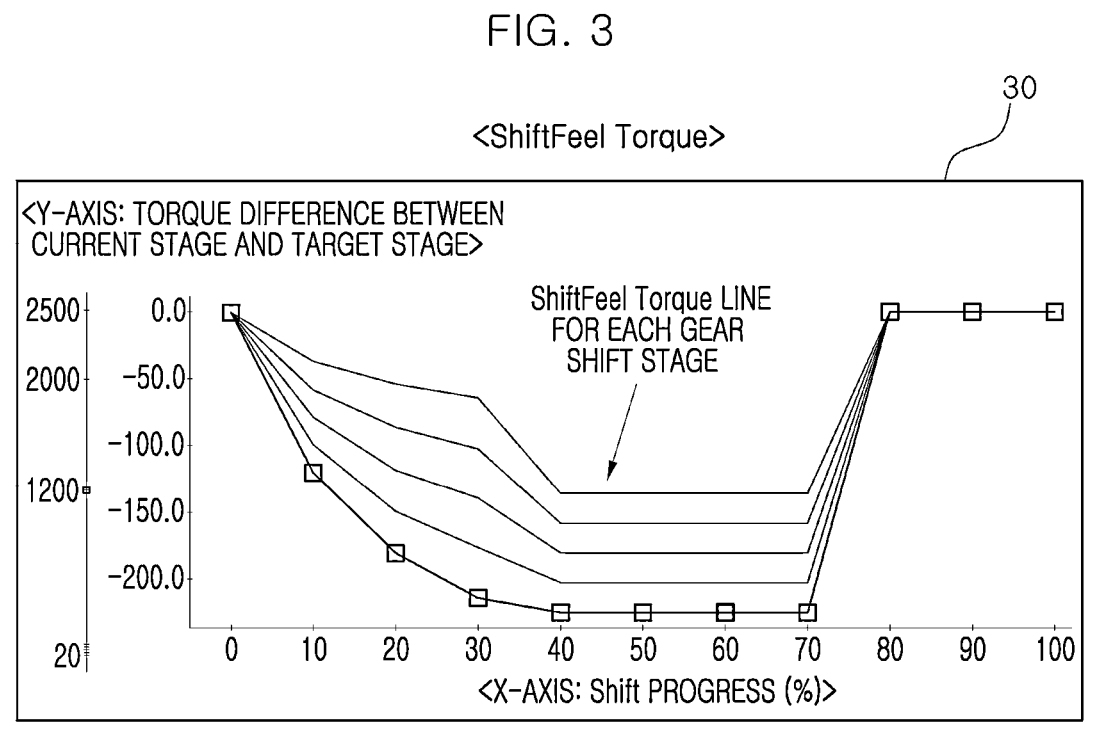

<ShiftFeel Torque>

30

<Y-AXIS: TORQUE DIFFERENCE BETWEEN
 CURRENT STAGE AND TARGET STAGE>

ShiftFeel Torque LINE
FOR EACH GEAR
SHIFT STAGE

<X-AXIS: Shift PROGRESS (%)>

<IMPLEMENTATION OF ENGINE BRAKE THROUGH
PowerOFF DownShift OF MANUAL MODE >

FIG. 5

<GEAR SHIFT STAGE INDICATION / RPM GAUGE IMPLEMENTATION>

METHOD OF IMPLEMENTING ENGINE BRAKING USING A VIRTUAL GEAR SHIFT SYSTEM OF AN ELECTRIC VEHICLE

CROSS-REFERENCE(S) TO RELATED APPLICATIONS

This application claims priority to Korean Patent Application No. 10-2023-0041632, filed on Mar. 30, 2023, which is incorporated herein by reference in its entirety.

BACKGROUND

Field

Embodiments of the present disclosure relate to a virtual gear shift (VGS) of an electric vehicle (EV). More particularly, the embodiments relate to a method of providing an engine braking feeling with a sense of distinction of a gear shift due to utilization of a VGS mode even in the EV by dividing a coasting torque profile into a coasting torque profile for each gear stage.

Description of Related Art

Generally, an electric vehicle (EV) uses a motor as a driving source for driving a vehicle. The EV is equipped with a battery, an inverter, a motor, and a reduction gear as a driving system. The battery supplies power to the motor, and the inverter is connected to the battery to drive and control the motor. The motor is connected to the battery as a driving source of the EV and the battery is configured to be charged and discharged through the inverter. The reduction gear is configured to reduce a rotating force of the motor and transmits the reduced rotating force to a driving wheel.

In particular, unlike an internal combustion engine (ICE) vehicle, since the EV does not use a multi-stage transmission, the reduction gear using a fixed gear ratio is disposed between the motor and the driving wheel.

Due to this mechanical difference, an EV may provide seamless and smooth driving characteristics from the aspect of gear shifting, unlike an internal-combustion-engine vehicle.

However, drivers who are interested in driving conventional internal combustion engine vehicles may become bored when driving EVs due to the absence of an internal combustion engine, a transmission, a clutch, or the like.

Therefore, a virtual gear shift (VGS) system may be applied to the EV to allow a driver to feel a shift similar to that of an internal combustion engine vehicle.

For example, the VGS system applies a virtual shift model and personalized parameters in order to implement engine characteristics and a shifting feeling. The virtual shift model is established by applying a gear shift map, a gear ratio, and a virtual engine speed. The personalized parameters include the number of gear shifts (e.g., eight stages) individually controlled by driver tuning, a magnitude/shape of a shift shock, a longitudinal reduction gear ratio, and a gear shift timing (e.g., application of a gear shift map).

Thus, the VGS system implements the engine characteristics and the shifting feeling from a VGS menu in a drive mode and a VGS function ON/OFF menu. The implementation of the engine characteristic and the shifting feeling provides driving force control according to the gear ratio for each gear stage and a real shifting feeling similar to that of an eight-stage transmission through variation of a torque of a motor.

Therefore, the EV can achieve differentiation of driving sensibility using the VGS system through multiple modes. The modes may include a comfort mode (comfort mode or normal mode), a sport mode, and a manual mode. In this case, the manual mode is performed by manipulating a paddle shift provided on a steering wheel (a (−) negative manipulation (i.e., a manual down shift)/a (+) positive manipulation (i.e., a manual up shift)).

However, when a vehicle driver has the intention to decelerate by turning an accelerator pedal off (an accelerator position scope (APS) off) during the coasting mode, the EV performs regenerative braking while decelerating according to an APS coasting torque profile. The APS coasting torque profile is not divided for each gear stage and instead calculates a reduction gear ratio from revolutions per minute (RPM) of the motor to output a vehicle speed in a cluster. In this way, the EV provides typical driving characteristics of EVs during vehicle deceleration, such as when a vehicle is coasting.

Therefore, the APS coasting torque profile, which is not divided for each gear stage of an EV for regenerative braking, is different from the VGS mode. The VGS mode can realize an actual shifting feeling similar to that of an eight-stage transmission by controlling a driving force according to a gear ratio of each gear stage and varying a torque of a motor.

Thus, when the APS coasting torque profile is directly used in the VGS mode, the EV fails to deliver a distinct gear shift sensation similar to that of an internal combustion engine (ICE) because there is a lack of differentiation in a torque profile for each gear stage. There inevitably occurs a problem in achieving engine braking experience that provides a noticeable and distinct deceleration sensation.

In addition, this problem inevitably implements engine braking in a limited manner even with a power-off down shift of the manual mode among the VGS modes.

The foregoing is intended merely to aid in the understanding of the background of the present disclosure. The foregoing is not intended to mean that the present disclosure falls within the purview of the related art that is already known to those having ordinary skill in the art.

SUMMARY

An embodiment of the present disclosure is directed to providing a method of implementing engine braking using a virtual gear shift (VGS) system of an electric vehicle (EV), which divides a coasting torque profile into coasting torque profiles for each gear shift stage to implement engine braking in a VGS mode. More particularly, the method is capable of providing an engine braking feeling due to a distinct sense of deceleration during a virtual gear shift when deceleration of an electric vehicle is performed. Deceleration of the electric vehicle is performed by using a target coasting torque and a gear shift feeling torque with respect to a target gear shift stage through gear shift feeling torque control using a coasting torque profile for each gear shift stage.

Other objects and advantages of the present disclosure can be understood by the following description and become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with an embodiment of the present disclosure, there is provided a method of implementing engine braking in an electric vehicle, which includes during power-off down shift control of a virtual gear shift (VGS) by turning a VGS function on, decelerating the electric vehicle through engine brake control by a coasting torque profile for each gear shift stage. The coasting torque profile for each gear shift stage is mapped to a drive mode of the VG. The method also includes providing VGS information and displaying on a cluster a virtual engine status according to the deceleration of the electric vehicle.

As an embodiment, the power-off down shift control is performed in a manual mode among drive modes of the VGS when the electric vehicle is coasting.

As an embodiment, the power-off down shift control may include recognizing an accelerator position scope (APS) off signal in a state in which an accelerator pedal is not pressed. The power-off down shift control may also include recognizing a manual down shift signal due to a manipulation of a paddle shift.

As an embodiment, the coasting torque profile for each gear shift stage represents a torque difference between a current gear shift stage and a target gear shift stage during shift progress.

As an embodiment, the engine brake control may include setting, by a controller, a gear shift feeling torque based on a torque difference between a target gear shift stage and a current gear shift stage of the VGS on a gear shift feeling torque line for the VGS of the coasting torque profile for each gear shift stage. The engine brake control may also include performing the shift progress to a target gear shift stage by the gear shift feeling torque. Additionally, the engine brake control may include performing regenerative braking of a motor by a target coasting torque of the target gear shift stage.

As an embodiment, the gear shift feeling torque may be set to allow an amount of the regenerative braking of the motor to increase to the target coasting torque as a gear is shifted to a lower gear shift stage.

As an embodiment, the providing of the VGS information may include calculating a virtual gear ratio for each gear shift stage, and selecting one among a gear stage, a vehicle speed, and virtual revolutions per minute (RPM) based the vehicle deceleration and displaying the selected one on the display as the virtual engine state.

As an embodiment, the virtual gear ratio for each stage may be calculated by multiplying the RPM of the motor, a reduction gear ratio, and a gear ratio.

In accordance with another embodiment of the present disclosure, there is provided an electric vehicle (EV) including a virtual gear shift (VGS) system configured to perform power-off down shift control by turning a VGS function on in response to an accelerator position scope (APS) off signal and a paddle shift signal. The virtual gear shift system may also be configured to perform shift progress using a gear shift feeling torque compensating for a torque difference between a target gear shift stage and a current gear shift stage of the VGS. Additionally, the virtual gear shift system may also be configured to control vehicle deceleration to increase an amount of regenerative braking using a target coasting torque as a gear is shifted to a lower gear shift stage. The electric vehicle may also include: an accelerator pedal configured to generate the APS off signal; a paddle shift configured to generate the paddle shift signal; and a motor configured to generate power to drive the EV.

As an embodiment, the VGS system may include a VGS mode torque profile map. The VGS mode torque profile map is a coasting torque profile for each gear shift stage, which is mapped to a drive mode of the VGS. Additionally, a shift feeling torque line to which a shift feeling torque is applied is established in the VGS mode torque profile map.

BRIEF DESCRIPTION OF THE DRAWINGS

The above and other objectives, features, and other advantages of the present disclosure should be more clearly understood from the following detailed description when taken in conjunction with the accompanying drawings.

FIG. 3 is a diagram illustrating an example of a shift feeling torque line for each gear shift stage applied to the virtual gear shift system according to the present disclosure.

FIG. 5 is a diagram illustrating an example of virtual engine information displayed on a cluster of the EV according to the present disclosure.

DETAILED DESCRIPTION

Embodiments of the present disclosure are described below in more detail with reference to the accompanying drawings. These embodiments are examples of the present disclosure and may be embodied in various other different forms by those having ordinary skill in the art to which the present disclosure pertains so that the present disclosure is not limited to these embodiments.

Further, the terms "module," "unit," and the like described in this specification are given or used together for the ease of description, but do not have a distinct meaning or function.

When it is determined that the detailed description of the known art related to the present disclosure may obscure the gist of the disclosure, the detailed description thereof is omitted. Further, it is to be understood that the accompanying drawings are merely for making those having ordinary skill in the art easily understand the embodiments disclosed herein. Furthermore, the present disclosure is intended to cover not only embodiments disclosed herein but also various alternatives, equivalents, or substitutes that fall within the spirit and scope of the present disclosure.

Although the terms "first," "second," and the like may be used herein to describe various elements, these elements should not be limited by these terms. These terms are only used to distinguish one element from another element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It should be further understood that the terms "comprise," "include," "have," and the like, when used in this specification, specify the presence of stated features, integers, steps, operations, elements, components, and/or combinations thereof. However, the terms do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or perform that operation or function.

Figure 1:
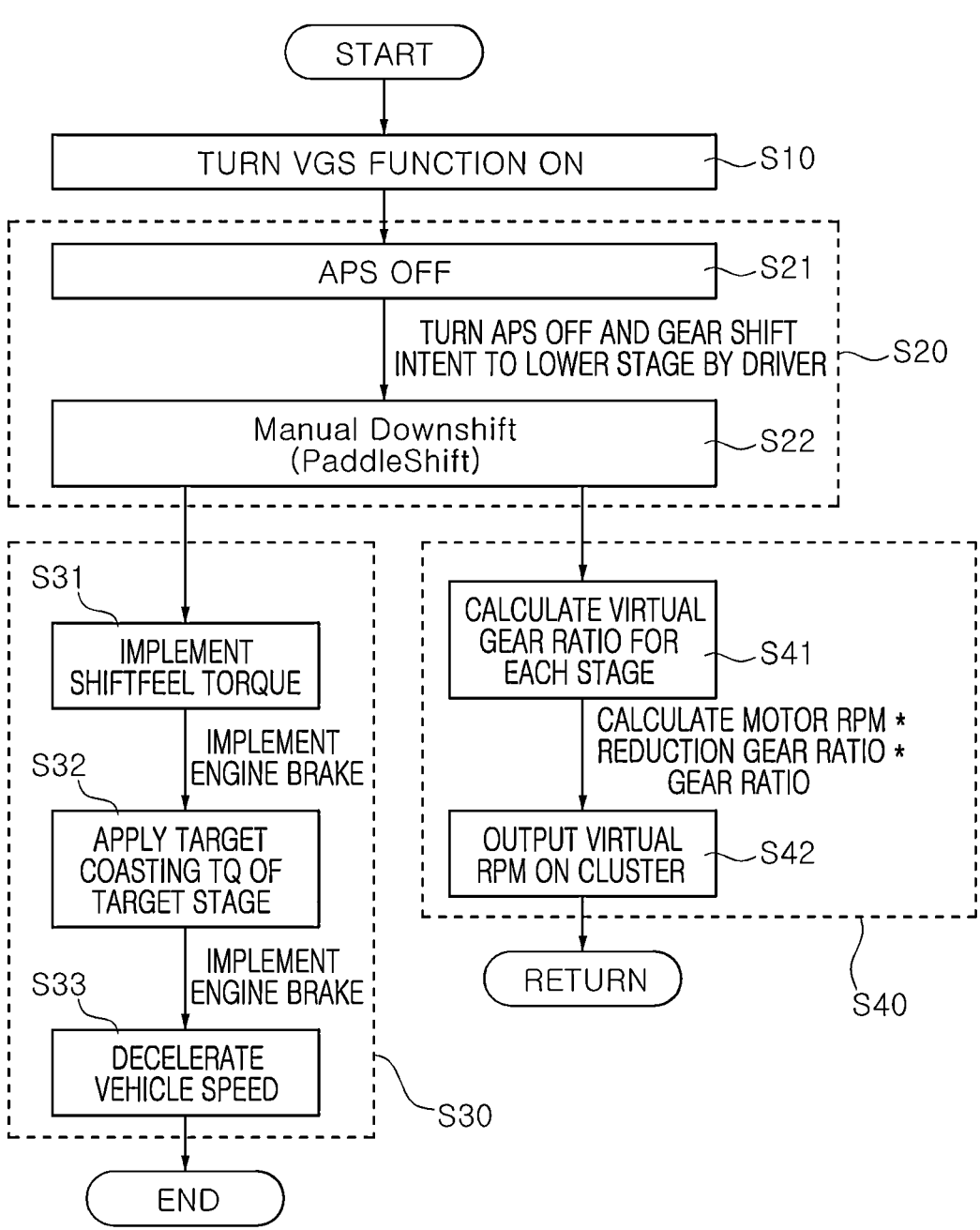
FIG. 1 is a flowchart illustrating a method of implementing an engine brake using a virtual gear shift system of an electric vehicle (EV) according to the present disclosure.

Referring to FIG. 1, a method of implementing engine braking includes turning a virtual gear shift function on in S10. Once the virtual gear shift function is turned on in S10, the method further includes controlling an engine brake in S30 and providing virtual gear shift information in S40 when in a power-off down shift (PowerOFF Manual Down-Shift) control state in S20.

In particular, when controlling the engine brake (S30), a virtual gear shift (VGS) mode divides the existing coasting torque profile into a coasting torque profile for each gear shift stage through a drive mode for each gear shift stage of a virtual gear shift model and a mapped coasting torque profile for each gear shift stage. The coasting torque profile for each gear shift stage solves a problem of a lack of differentiation of a torque profile for each gear stage in the existing accelerator position scope (APS) torque profile. Thus, the engine braking feeling, having a sense of distinction during gear shifts, may be implemented even in the VGS mode of the EV.

Therefore, the method of implementing engine braking is characterized as a method of implementing engine braking using a VGS system of an EV.

Figure 2:
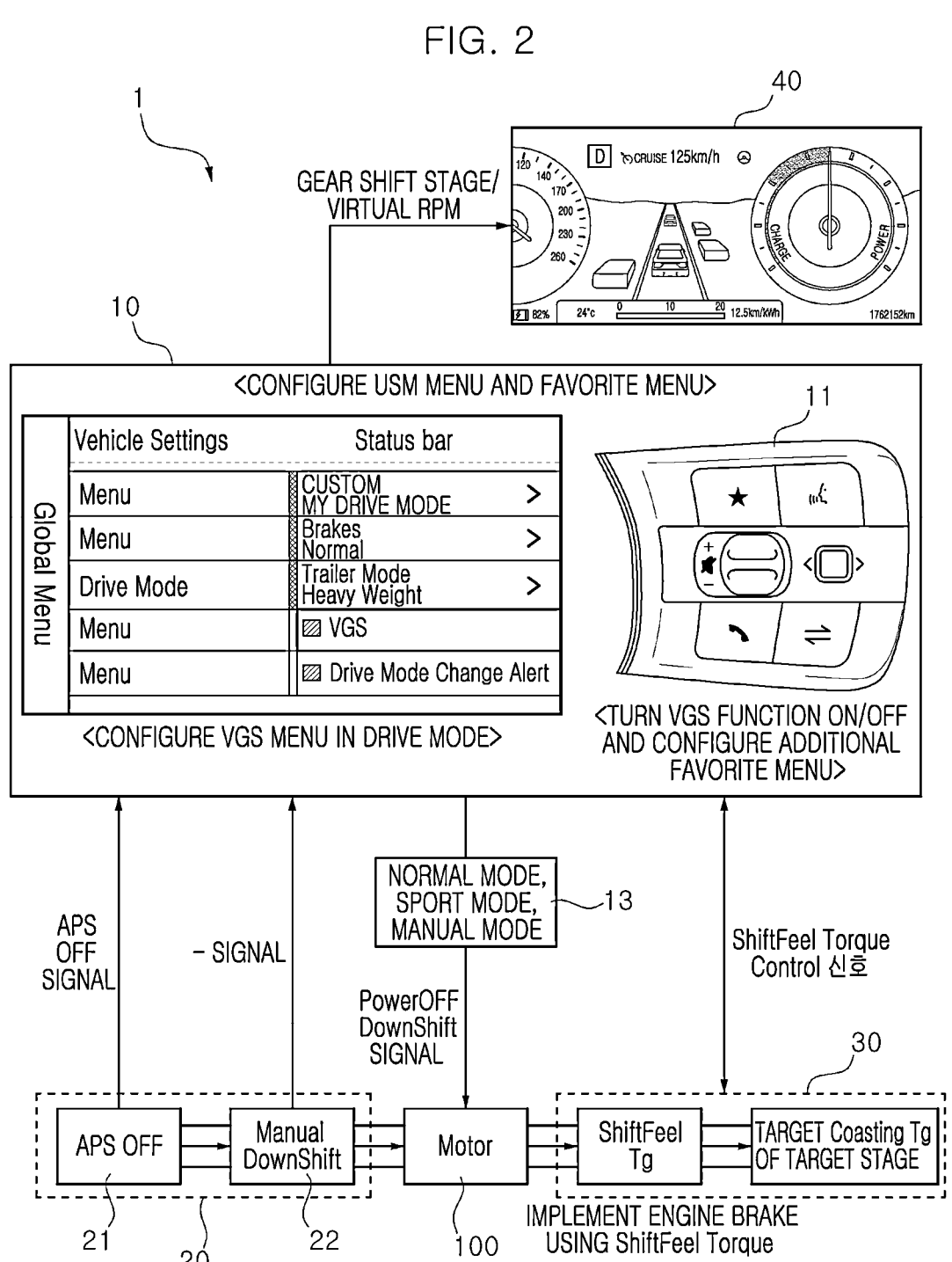
FIG. 2 is a diagram illustrating an example of the virtual gear shift system applied to the EV to implement the engine brake according to the present disclosure.

Referring to FIG. 2, a VGS system 1 that is applied to an EV using a motor 100 as a driving source includes a controller 10, an input part 20, a VGS mode torque profile map 30, and a cluster 40 (or a cluster display). In this case, the motor 100 generates power for driving the EV and power during regenerative braking for the state of charge (SOC) of a battery. Additionally, the motor 100 is a typical driving motor for an EV.

As one example, the controller 10 includes a manipulation part 11 for turning a VGS function on or off. The controller 10 also includes a mode output part 13 for differentiating driving sensibility by setting a driving mode of the EV to three VGS modes including a comfort mode (comfort mode or normal mode), a sport mode, and a manual mode. In this case, the controller 10 is a vehicle control unit (VCU) for integrally controlling a driving system of the EV.

As one example, the comfort mode (comfort mode or normal mode) is a VGS implementation for reflecting a comfort driving sensibility intent and an eight-stage automatic transmission (AT) sensibility. The sport mode is a VGS implementation for reflecting a sporty driving sensibility intent and eight-stage double clutch transmission (DCT) sensibility. Additionally, the manual mode is a manual VGS implementation involving a paddle shift 22.

In particular, the controller 10 performs an engine braking implementation mode (S40) using a VGS mode torque profile that is distinct from the existing APS torque profile. This occurs during a power-off manual down shift when a driver intends to decelerate while coasting (i.e., a (−) negative manipulation situation of the paddle shift 22). Thus, during deceleration, when a virtual gear is shifted, an engine brake feeling like that of an internal combustion engine (ICE) may be provided by providing a distinct sense of deceleration.

To this end, the controller 10 is connected with the input part 20 and the VGS mode torque profile map 30.

As one example, the input part 20 may be configured to transmit an APS OFF signal of an accelerator pedal 21 and may be configured to transmit a paddle shift signal of the paddle shift 22 (e.g., PaddleShift of a (−) negative manipulation signal) to the controller 10. The controller 10 may be configured to check whether an intent of the driver is to decelerate the EV or may be configured to check whether an intent of the driver is to shift into a down gear according to a power-off during coasting using the APS OFF signal and controlling a manual down shift (Manual DownShift) using the paddle shift signal.

In this case, the paddle shift 22 is a gear shift device which operates only in "D (drive)" and is capable of being shifted without taking a driver's hand off of a steering wheel through the use of a paddle shift+UP function or a paddle shift-DOWN function. The paddle shift+UP function is configured to raise a gear stage and the paddle shift-DOWN function is configured to lower a gear stage. The paddle shift 22 lowers a gear stage to prevent an increase in speed where the EV is braking by using the engine brake.

As one example, the VGS mode torque profile map 30 is a coasting torque profile for each gear shift stage, which is mapped to the drive mode for each gear shift stage of the virtual shift model. The VGS mode torque profile 30 solves a problem of a lack of differentiation of torque profiles for each gear shift stage in the existing APS torque profile so that the engine brake may be implemented.

Specifically, as shown in FIG. 3, the VGS mode torque profile map 30 is a coasting torque profile for each gear shift stage, which is mapped to the drive mode of the VGS system. A shift feeling torque line (ShiftFeel Torque Line) to which a shift feeling torque (ShiftFeel Torque) is applied is also established in the VGS mode torque profile map 30.

Therefore, the VGS mode torque profile map 30 may be used to set the shift feeling torque (ShiftFeel Torque) due to a torque difference between a target stage and a current stage of the VGS system. The VGS mode torque profile map 30 may also be used to have the shift feeling torque line (ShiftFeel Torque Line) to which the shift feeling torque (ShiftFeel Torque) is applied. Furthermore, the VGS mode torque profile map 30 may be used to compensate for the torque difference with a target coasting torque (Target Coasting Tq) due to the shift feeling torque (ShiftFeel Torque) during a shift progress.

As one example, the cluster 40 visualizes a virtual engine state by displaying a gear shift stage and revolutions per minute (RPM) of the motor in a portion of a dashboard that is located near a driver's seat of the EV. The visualization enables the driver to experience a VGS state and an engine braking implementation state.

Hereinafter, the method of implementing engine braking is described in detail with reference to FIGS. 2-5. In this case, a control main body is the controller 10, and a control target is the motor 100.

First, the controller 10 recognizes that the virtual shift function is activated by turning the VGS function on in S10. As shown in FIG. 2, this recognition is performed by the controller 10 with a signal that is received from turning the VGS function on through the manipulation part 11.

Next, the controller 10 consistently checks a condition of the power-off down shift (PowerOFF Manual DownShift)

control in S20 while the EV is traveling. This is performed through an APS OFF in S21 and a Manual Downshift (PaddleShift) in S22.

Referring to FIG. 2, the controller 10 performs signal recognition (S21) with respect to when the APS OFF signal is generated by the accelerator pedal 21 of the input part 20 being actuated (i.e., pressed or not pressed). In other words, a signal for the accelerator pedal off (APS OFF) of the accelerator pedal 21 is generated when the intent of the vehicle driver is to decelerate or to shift to a lower gear when in the coasting mode. Subsequently, the controller 10 performs signal recognition (S22) with respect to a (−) negative manipulation signal of the paddle shift 22. Thus, the mode output part 13 selects the manual mode among the other modes such as comfort mode (comfort mode or normal mode), sport mode, and manual mode.

Therefore, the controller 10 outputs a power-off down shift (PowerOFF DownSHIFT) command (or signal).

Subsequently, the controller 10 provides the virtual engine information in S40 together with the controlling of the engine brake in S30.

Specifically, the controlling of the engine brake (S30) includes implementing a gear shift feeling torque (ShiftFeel Torque)(S31), applying the target coasting torque (Target Coasting Tq) of the target gear shift stage (S32), and decelerating the EV (S33).

Referring to FIG. 2, the controller 10 outputs a gear shift feeling torque control (ShiftFeel Torque Control) command (or signal) in conjunction with the VGS mode torque profile map 30. The gear shift feeling torque control (ShiftFeel Torque Control) command applies the target coasting torque (Target Coasting Tq) (S32) of the target gear shift stage according to implementing a gear shift feeling torque (Shift-Feel Torque) (S31) to temporarily utilize the motor torque of the motor 100 until the decelerating of the EV (S33) is completed. The purpose of this approach is to advantageously generate an engine brake feeling during vehicle deceleration, thus resulting in a distinct sense of vehicle deceleration associated with a virtual gear shift. This distinct sense of deceleration is achieved by using instantaneous torque changes and torque step differences for each gear stage.

Referring to FIG. 3, the gear shift feeling torque (Shift-Feel Torque) corresponds to a gear shift feeling torque (ShiftFeel Torque) line exemplified in an X-Y coordinate. The gear shift feeling torque (ShiftFeel Torque) is differentiated for each gear shift stage (e.g., an eight-stage DCT) with respect to a drive mode of the virtual shift model. In this case, an X-axis represents a shift progress and means the range from 0% to 100% during the shift process. A Y-axis means the torque difference between the current stage and the target stage (that is, the gear-shifted stage). For example, the Y-axis may mean a difference between an amount of regenerative braking at a fourth stage and an amount of regenerative braking at a third stage when the current stage is the fourth stage and is down shifted to the third gear).

Therefore, as shown in a quadrangular box indicating a progress rate of 0%→10%→20%→30%→40%→50%→60%→70% on the shift feeling torque line (ShiftFeel Torque Line), when the power-off down shift (PowerOFF DownSHIFT) command (or signal) is inputted, the gear shift feeling torque (ShiftFeel Torque) (S31) temporarily lowers the motor torque of motor 100 so that the engine brake is implemented.

Figure 4:
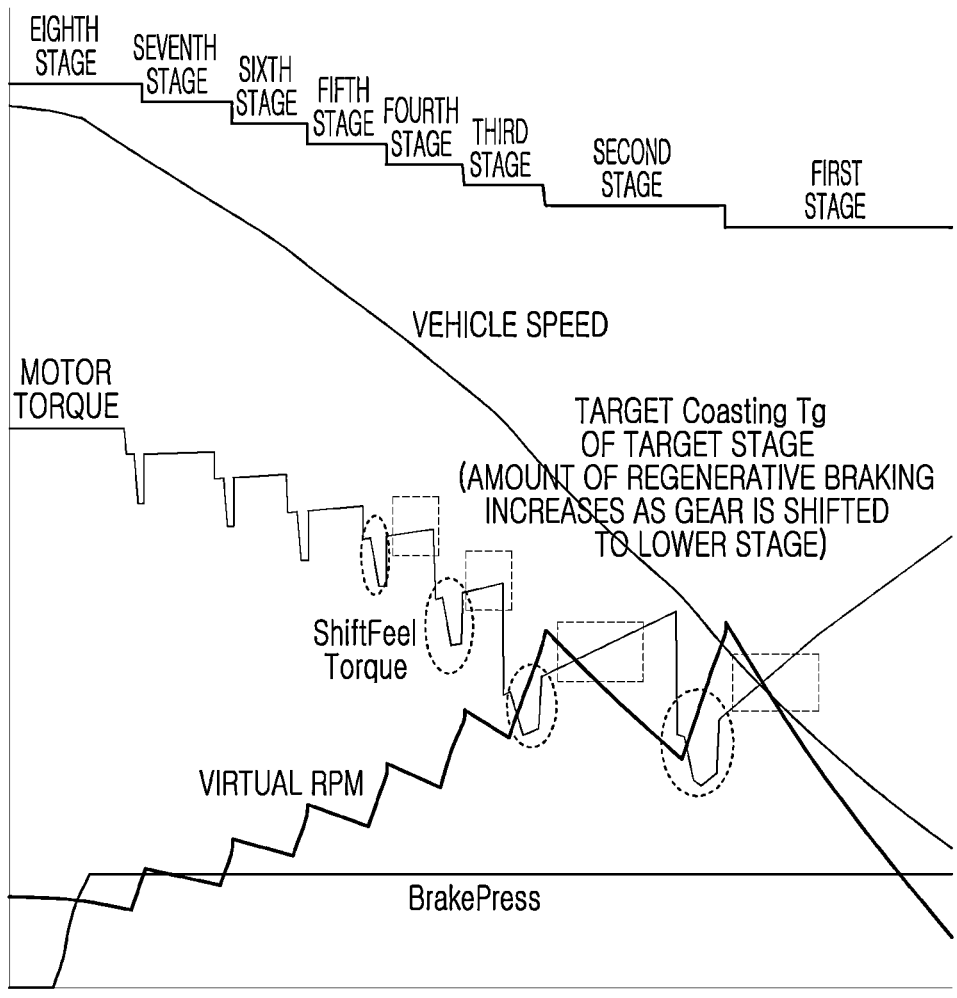
FIG. 4 is a diagram illustrating an engine brake implementation state through a power-off down shift in a manual mode according to the present disclosure.

Referring to FIG. 4, an operation in which the target coasting torque implements engine braking with an actual gear shift feeling similar to that of an eight-stage transmission is exemplified.

As shown in FIG. 4, an amount of regenerative braking, applied to achieve the target coasting torque of the target coasting torque (Target Coasting Tq) (S32), is determined according to the gear shift feeling torque (ShiftFeel Torque) (e.g., shown as an elliptical shape).

As one example, a relationship between the gear shift feeling torque (ShiftFeel Torque) and the target coasting torque (Target Coasting Tq) gradually increases the amount of regenerative braking of the target coasting torque (Target Coasting Tq) as a current gear is being shifted to a lower gear stage (the quadrangular box indication of a fourth stage→a third stage→a second stage→first stage) after the gear shift feeling torque control (ShiftFeel Torque Control) command is activated. As a result, an engine brake feeling may be implemented due to the increase in deceleration after the gear shift. In this case, the maximum amount of regenerative braking is set within a range of the accelerator pedal 21.

Therefore, in the implementation of the gear shift feeling torque (ShiftFeel Torque) (S31) in the controlling of the engine brake (S30), the gear shift feeling torque (ShiftFeel Torque) is set by the torque difference between the target stage and the current stage of the VGS. The gear shift feeling torque (ShiftFeel Torque) is applied to the shift feeling torque line (ShiftFeel Torque Line) for the VGS in the coasting torque profile for each gear shift stage. The torque difference is compensated for by the target coasting torque (Target Coasting Tq) of the target gear shift stage due to the gear shift feeling torque (ShiftFeel Torque) during the shift progress when applying the target coasting torque (Target Coasting Tq) (S32). The battery may be charged by the amount of regenerative braking of the motor 100 due to the target coasting torque (Target Coasting Tq) when decelerating the EV (S33).

In particular, the target coasting torque (Target Coasting Tq) increases the amount of regenerative braking of the motor 100 as a gear is shifted to a lower gear stage during the shift progress ranging from 0% to 100%. This is because when the gear shift feeling torque (ShiftFeel Torque) is set by reflecting the torque difference, a value of the target coasting torque (Target Coasting Tq) is increased to implement the engine brake feeling by increasing a deceleration feeling after the gear shift.

Specifically, providing the virtual gear shift information (S40) includes calculating a virtual gear ratio for each stage in S41, and outputting the virtual gear shift information to the cluster in S42.

As one example, the virtual gear ratio for each gear shift stage (S41) is calculated as "RPM of the motor 100*reduction gear ratio*gear ratio of reduction gear." In this case, "*" is a symbol that means multiplication. In other words, the virtual gear ratio is calculated by multiplying the RPM of the motor, the reduction gear ratio, and the gear ratio.

Figure 5:
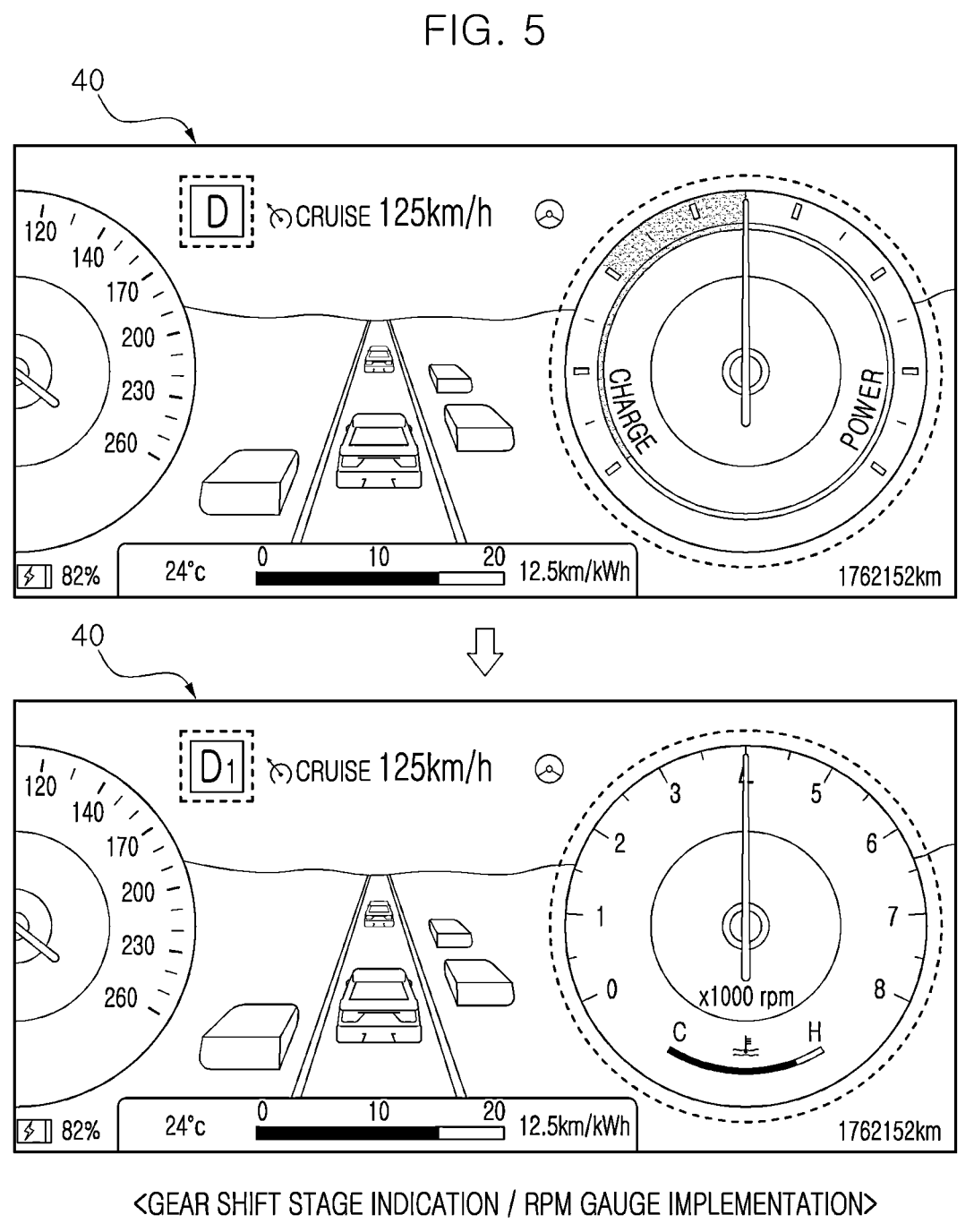

FIG. 5 illustrates that the virtual gear shift information in S42 includes a gear shift stage according to vehicle deceleration, a vehicle speed, and a virtual RPM. This information is displayed in the cluster 40 of the driver's seat as an engine brake implementation state of a virtual engine.

As described above, the method of implementing engine braking using a VGS system of an EV according to the present embodiment is connected with the VGS mode torque profile map 30. The shift feeling torque line (ShiftFeel Torque Line), to which the gear shift feeling torque (Shift- Feel Torque) is applied as the coasting torque profile for each gear shift stage mapped to the drive mode of the VGS, is established in the VGS mode torque profile map 30. Additionally, the method of implementing engine braking using a VGS system of an EV performs vehicle deceleration by the regenerative braking of the motor 100 due to the target coasting torque (Target Coasting Tq). The target coasting torque (Target Coasting Tq) compensates for the torque difference between the current stage and the target stage during the shift progress using the gear shift feeling torque line (ShiftFeel Torque line) (S31) for the VGS of the coasting torque profile for each gear shift stage that is mapped to the drive mode of the VGS during the power-off down shift (PowerOFF DownShift) control (S20) when the VGS function is turned on (S10).

In addition, the method of implementing engine braking using a VGS system of an EV implements the engine braking feeling by increasing the deceleration feeling after a gear shift. This is achieved due to the increase of the amount of regenerative braking of the motor 100 as the gear is shifted to a lower stage in the process of a virtual gear shift progress for vehicle deceleration. In particular, the method provides the engine braking feeling due to the deceleration of the EV having a sense of distinction when the virtual gear is shifted during the deceleration by the gear shift feeling torque (ShiftFeel Torque) and the target coasting torque (Target Coasting Tq) with respect to the target gear shift stage. The engine braking feeling is implemented through the gear shift feeling torque control (ShiftFeel Torque Control) utilizing the coasting torque profile for each gear shift stage.

In implementing engine braking using a virtual gear shift (VGS) system of an electric vehicle (EV), a coasting torque profile for each gear shift stage applicable in a VGS mode can be established.

In particular, the coasting torque profile for each gear shift stage solves a problem of insufficient differentiation of torque profiles for each stage of the existing accelerator position scope (APS) coasting torque profile. Thus, even a VGS system can implement an engine brake feeling having a sense of distinction during a gear shift, similar to an engine brake feeling of an internal combustion engine (ICE).

In addition, an EV in which the engine brake of the present disclosure is implemented has actions and effects that can be performed in all EVs to which a VGS function using the VGS system is applied.

While the present disclosure has been described with reference to the accompanying drawings, it should be apparent to those having ordinary skill in the art that various changes and modifications can be made without departing from the spirit and scope of the present disclosure. Additionally, it should be apparent to those having ordinary skill in the art that various changes and modifications can be made without being limited to the embodiments disclosed herein. Accordingly, it should be noted that such alternations or modifications fall within the claims of the present disclosure, and the scope of the present disclosure should be construed on the basis of the appended claims.

What is claimed is:

1. A method of implementing virtual engine braking of an electric vehicle in a virtual gear shift (VGS) of the electric vehicle when a VGS function of a VGS system is turned on, the method comprising:

during a virtual power-off down shift (PowerOFF DownShift) control, decelerating the electric vehicle through virtual engine brake control by a coasting torque profile for each virtual gear shift stage, which is mapped to a drive mode of the VGS system; and providing VGS information and displaying on a cluster a virtual engine status according to the deceleration of the electric vehicle, wherein the virtual engine brake control is configured to:

set, by a controller, a gear shift feeling torque (ShiftFeel Torque) based on a torque difference between a virtual target gear shift stage and a virtual current gear shift stage of the VGS on a gear shift feeling torque line (ShiftFeel Torque Line) for the VGS of the coasting torque profile for each virtual gear shift stage;

perform shift progress to the virtual target gear shift stage by the gear shift feeling torque (ShiftFeel Torque) and perform regenerative braking of a motor by a target coasting torque (Target Coasting Tq) of the virtual target gear shift stage; and decelerate the vehicle through the shift progress, and wherein a relationship between the gear shift feeling torque (ShiftFeel Torque) and the target coasting torque (Target Coasting Tq) gradually increases an amount of the regenerative braking of the motor to increase to the target coasting torque (Target Coasting Tq) as a gear is shifted to a lower virtual gear shift stage after the gear shift feeling torque control (ShiftFeel Torque Control) command is activated.

2. The method of claim 1, wherein the virtual power-off down shift (PowerOFF DownShift) control is performed in a manual mode among drive modes of the VGS when the electric vehicle is coasting.

3. The method of claim 2, wherein the virtual power-off down shift (PowerOFF DownShift) control includes:

recognizing an accelerator position scope (APS) off signal in a state in which an accelerator pedal is not pressed; and recognizing a manual down shift (Manual DownSHIFT) signal based on a manipulation of a paddle shift.

4. The method of claim 1, wherein the coasting torque profile for each virtual gear shift stage represents a torque difference between the virtual current gear shift stage and the virtual target gear shift stage during shift progress.

5. The method of claim 1, wherein the providing of the VGS information includes:

calculating a virtual gear ratio for each virtual gear shift stage; and selecting and displaying one of a gear stage, a vehicle speed and virtual revolutions per minute (RPM) as the virtual engine state on the cluster based on the vehicle deceleration.

6. The method of claim 5, wherein the virtual gear ratio for each virtual gear shift stage is calculated by multiplying a RPM of a motor, a reduction gear ratio, and a gear ratio.

7. An electric vehicle (EV), comprising:

a virtual gear shift (VGS) system configured to:

perform virtual power-off down shift (PowerOFF DownShift) control by turning a VGS function on in response to an accelerator position scope (APS) off signal and a paddle shift signal, perform shift progress using a gear shift feeling torque (ShiftFeel Torque) compensating for a torque difference between a virtual target gear shift stage and a virtual current gear shift stage of the VGS, and control vehicle deceleration to increase an amount of regenerative braking using a target coasting torque (Target Coasting Tq) as a gear is shifted to a lower virtual gear shift stage;

an accelerator pedal configured to generate the APS off signal;

a paddle shift configured to generate the paddle shift signal;

a motor configured to generate power to drive the EV; and a control configured to:

set, by a controller, a gear shift feeling torque (ShiftFeel Torque) based on a torque difference between the virtual target gear shift stage and the virtual current gear shift stage of the VGS on a gear shift feeling torque line (ShiftFeel Torque Line) for the VGS of the coasting torque profile for each virtual gear shift stage;

perform shift progress to the virtual target gear shift stage by the gear shift feeling torque (ShiftFeel Torque) and perform regenerative braking of a motor by a target coasting torque (Target Coasting Tq) of the virtual target gear shift stage; and decelerate the vehicle through the shift progress, and wherein a relationship between the gear shift feeling torque (ShiftFeel Torque) and the target coasting torque (Target Coasting Tq) gradually increases an amount of the regenerative braking of the motor to increase to the target coasting torque (Target Coasting Tq) as a gear is shifted to a lower virtual gear shift stage after the gear shift feeling torque control (ShiftFeel Torque Control) command is activated.

8. The EV of claim 7, wherein:

the VGS system includes a VGS mode torque profile map; and the VGS mode torque profile map is a coasting torque profile for each virtual gear shift stage, which is mapped to a drive mode of the VGS system, and a shift feeling torque line (ShiftFeel Torque Line) to which a shift feeling torque (ShiftFeel Torque) is applied to is established in the VGS mode torque profile map.

* * * * *